United States Patent
Richardson et al.

(10) Patent No.: US 10,717,473 B2
(45) Date of Patent: Jul. 21, 2020

(54) DRAIN VALVE

(71) Applicant: Zephyros, Inc., Romeo, MI (US)

(72) Inventors: Henry E. Richardson, Washington, MI (US); Alexander Mangiapane, Macomb Township, MI (US); Nick Holstine, Royal Oak, MI (US)

(73) Assignee: Zephyros, Inc., Romeo, MI (US)

( * ) Notice: Subject to any disclaimer, the term of this patent is extended or adjusted under 35 U.S.C. 154(b) by 55 days.

(21) Appl. No.: 16/078,184

(22) PCT Filed: Feb. 9, 2017

(86) PCT No.: PCT/US2017/017169
§ 371 (c)(1),
(2) Date: Aug. 21, 2018

(87) PCT Pub. No.: WO2017/139459
PCT Pub. Date: Aug. 17, 2017

(65) Prior Publication Data
US 2019/0047635 A1 Feb. 14, 2019

Related U.S. Application Data

(60) Provisional application No. 62/293,525, filed on Feb. 10, 2016.

(51) Int. Cl.
| | | |
|---|---|---|
| *B62D 25/24* | (2006.01) | |
| *F16K 15/14* | (2006.01) | |
| *F16K 15/03* | (2006.01) | |
| *B62D 25/08* | (2006.01) | |
| *B60H 1/24* | (2006.01) | |
| *B60R 13/07* | (2006.01) | |

(52) U.S. Cl.
CPC .............. *B62D 25/24* (2013.01); *B60H 1/249* (2013.01); *B62D 25/081* (2013.01); *F16K 15/03* (2013.01); *F16K 15/144* (2013.01); *B60R 13/07* (2013.01)

(58) Field of Classification Search
CPC ...... B62D 25/24; B62D 25/081; B60H 1/249; F16K 15/03; F16K 15/144; B60R 13/07
See application file for complete search history.

(56) References Cited

U.S. PATENT DOCUMENTS

2013/0088050 A1    4/2013    Lacroix

FOREIGN PATENT DOCUMENTS

| DE | 102010055637 | 6/2012 |
|---|---|---|
| JP | 2005306234 A | 11/2005 |
| JP | 2005313692 A | 11/2005 |
| JP | 2008273502 A | 11/2008 |

OTHER PUBLICATIONS

PCT Search Report & Written Opinion dated May 15, 2017, Application No. PCT/US2017/017169.

*Primary Examiner* — Lori L Lyjak
(74) *Attorney, Agent, or Firm* — The Dobrusin Law Firm, PC

(57) ABSTRACT

A drain valve (10), such as for a vehicle body structure, having: at least one frame (12); and at least one flap (14) secured to the at least one frame (12); at least one drain opening (13); wherein the at least one drain valve (10) is located within the at least one drain opening (13); wherein the at least one drain valve (10) has at least two positions: a sealed position, in which the at least one flap (14) prevents airflow; and an open position, in which the at least one flap (14) allows liquid to flow through the at least one drain valve (10).

18 Claims, 2 Drawing Sheets

DRAIN VALVE

FIELD

The present disclosure relates to a drain valve, which may be used to allow for water flow and provide an air seal. The present disclosure may specifically relate to a drain valve which may find particular use in automotive body structures, such as a plenum.

BACKGROUND

Vehicle bodies generally require the use of drains to allow for water to drain from the vehicle. This water may tend to accumulate in contoured areas of the vehicle. The contoured areas of the vehicle may include areas of the vehicle frame such as a plenum in the dash area, door openings, the front and/or rear bumper, or any other areas of the vehicle which may tend to accumulate water. The water may accumulate when the vehicle is exposed to natural elements, such as rain or snow. The accumulation of water may lead to deterioration of the vehicle paint, coatings, corrosion of the frame, leaking of the water into the vehicle interior, leaking of water into electrical components, or the like.

Generally, vehicles may include drain openings which allow for both the passage of water and air to flow through, so as to allow the liquid to drain from the vehicle. Some vehicles may include drain plugs, which may be inserted into the drain openings, and removed to allow for water to pass through. Some vehicles may use drain hoses to route collected water to a draining location. Some vehicles may use drain valves, which may include a stationary mesh, or similar screen, which allows for water and air to pass through. These drains may create a back pressure which may slow or prevent the exit of part or all of the liquid. These drains may create turbulence in the water flow as the water drains, which may lead to a slower draining rate, a longer draining time, and/or residual water remaining on the vehicle body. If water drains slowly, the water may overflow into other areas of the vehicle body. These drains may require intervention to drain the water. These drains may also allow for air to flow both in and out of the drain opening, creating an additional air flow path. This additional air may be undesired, for example, cold air in the winter months entering a heated vehicle may create a cool air draft for an occupant of the vehicle.

What is needed is a drain valve which may allow the flow of water from a vehicle body or frame, such as a plenum or other area. What is needed is a drain valve which may prevent the flow of air. What is needed is a drain valve which does not require human intervention to allow water to exit a drain opening. What is needed is a drain valve which may allow water to flow while free of turbulence. What is needed is a drain valve which may be free of back pressure.

SUMMARY

The present disclosure relates to a drain valve, comprising: (i) at least one frame; and (ii) at least one flap secured to the at least one frame; wherein the drain valve has at least two positions: (i) a sealed position, in which the at least one flap prevents airflow; and (ii) an open position, in which the at least one flap allows liquid to flow through the at least one drain valve.

The present disclosure relates to a vehicle body structure, comprising: (i) at least one drain valve having: (a) at least one frame; and (b) at least one flap secured to the at least one frame; (ii) at least one drain opening; wherein the at least one drain valve is located within the at least one drain opening; wherein the at least one drain valve has at least two positions: (a) a sealed position, in which the at least one flap prevents airflow; and (b) an open position, in which the at least one flap allows liquid to flow through the at least one drain valve.

In some preferred embodiments, the drain valve of the disclosure may include a sealing plane which may cooperate with the at least one flap. In some preferred embodiments, the at least one frame of the drain valve may be a unitary piece. In some preferred embodiments, the at least one drain valve may allow liquid to pass through which is free of turbulence. In some preferred embodiments, the at least one drain valve may be free of back pressure opposed to the flow of the liquid.

The drain valve of the disclosure may be inserted into a vehicle body, to allow the flow of accumulated water. The drain valve may prevent the flow of air in a direction opposite the desired flow of water. The drain valve may prevent air flow and allow water flow to drain without any additional human intervention. The drain valve may allow water to flow while free of turbulence. The drain valve may be free or minimal of back pressure opposing the flow of liquid.

DETAILED DESCRIPTION

Figure 1:
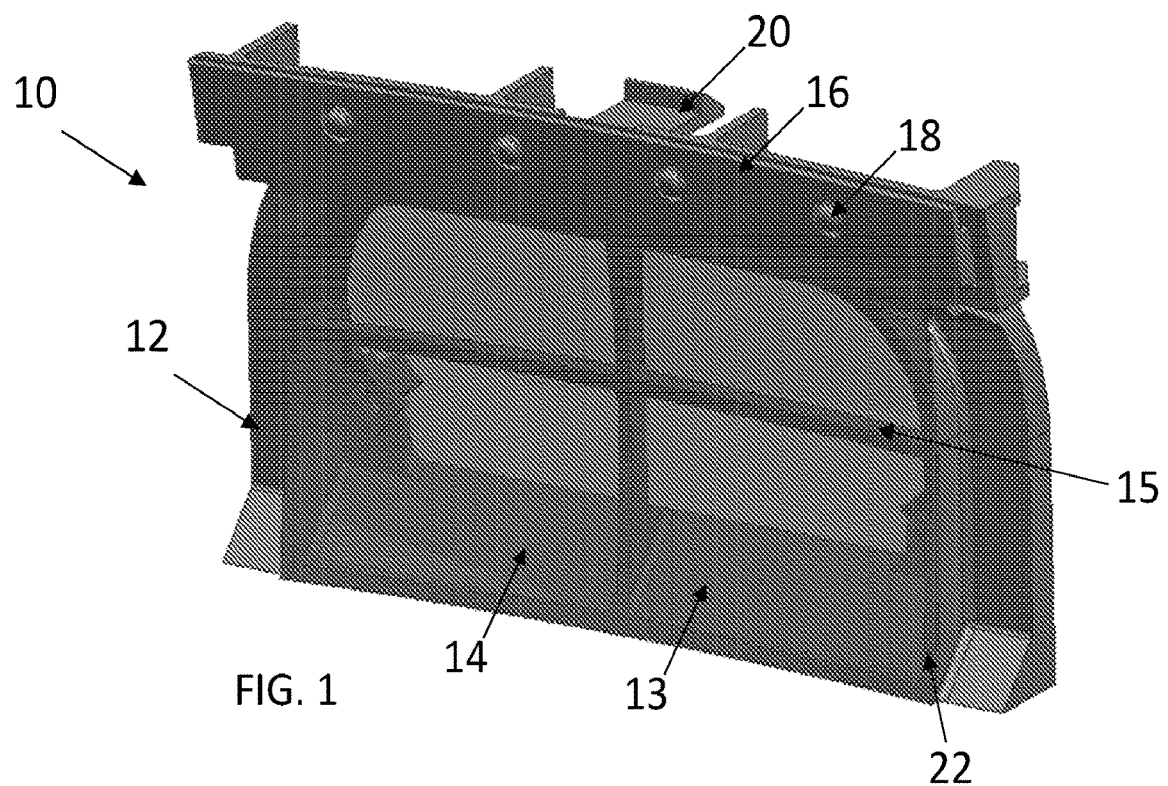
FIG. 1 illustrates a front side of a drain valve.

The explanations and illustrations presented herein are intended to acquaint others skilled in the art with the present teachings, its principles, and its practical application. The specific embodiments of the present teachings as set forth are not intended as being exhaustive or limiting of the present teachings. The scope of the present teachings should be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application is related to and claims the benefit of the filing date of U.S. Provisional Application No. 62/293,525, filed Feb. 10, 2016, the contents of this application being hereby incorporated by reference for all purposes.

The present teachings relate to a drain valve. The drain valve may be able to prevent airflow, allow liquid to flow through, or both. The drain valve may be suitable for automotive structures, such as bodies or frames. The drain valve may be particularly suitable for use in an automotive plenum. The drain valve may include at least one frame and at least one flap secured to the at least one frame. The drain valve may include a sealed position, in which the at least one flap prevents airflow through the drain valve. The drain valve may include an open position, in which the at least one flap allows liquid to flow through the at least one drain valve. The drain valve may further prevents accumulation of water or residual water by being free of any contours or areas which may collect water.

The drain valve may include at least one frame. The at least one frame may function to provide a housing for a flap or other structure. The at least one frame may function to affix the drain valve to a structure, such as an automotive body. The at least one frame may function to engage or cooperate with an opening, such as a drain opening. The at least one frame may be any suitable shape, such as rectangular, circular, square, triangular, elliptical, ovular, trapezoidal, oblong, the like, or any combination thereof. The at least one frame may be comprised of any suitable material or materials. For example, the at least one frame may be comprised of a metal, a plastic, a rubber, a silicone, the like, or any combination thereof. The at least one frame may be any suitable size, such as for cooperating with a drain opening. The at least one frame may include one or more attachment features to engage drain valve into an opening, such as a drain opening. The one or more attachment features may include protrusions, tabs, screws, push pins, the like, or a combination thereof. For example, one or more protrusions, such as tabs, may be located about a perimeter of the at least one valve. The protrusions may engage with one or more openings of a structure, such as an automotive body. The one or more protrusions may each be inserted into individual openings in the automotive body or they may be inserted into an interior perimeter of a single opening. The one or more attachment features may provide for an interference fit, a snap fit, a secured fit, a press fit, the like, or a combination thereof with one or more openings. The at least one frame may include at least one flow opening. The at least one flow opening may allow for liquid to exit the drain valve. The at least one flow opening may be centrally located within the valve frame. The at least one flow opening may be of sufficient size to minimize or prevent back pressure being applied to liquid as it flows through the valve frame. The at least one valve frame may include one or more support structures. The one or more support structures may act as braces. The one or more support structures may extend across the at least one flow opening. The at least one or more support structures may provide the at least one frame with structural support during flow of liquid through the at least one flow opening. The one or more support structures may also control the flow of the liquid while exiting the at least one flow opening. For example, the one or more support structures may separate a flow of liquid to prevent turbulence, such as by creating a laminar flow. The at least one frame may further prevent the accumulation of water or residual water by being free of accumulation areas on the back surface, which may trap water. For example, the at least one frame may be contoured such that the back surface slopes towards the at least one flow opening to prevent any residual water remaining on the back surface. Located onto the at least one valve frame may be at least one valve flap.

The drain valve may include at least one valve flap. The valve flap may function to allow water to pass through the drain valve. The valve may function to prevent air flow through the drain valve. The valve flap may function to cover the at least one flow opening. The valve flap may have any suitable shape. The valve flap may have a shape substantially similar to that of the at least one flow opening. The valve flap may any suitable size. The valve flap may have a length and a width larger than the at least one flow opening, so as to seal the at least one flow opening. The valve flap may have a length and width smaller than an exterior length and width of the at least one valve frame. The valve flap may be made of any suitable material which is able to restrict or prevent access of air flow through the drain valve when in a sealed position. For example, the valve flap may be comprised of metal, a plastic, a rubber, a silicone, the like, or any combination thereof. The valve flap may be hingedly or rotationally affixed to the valve frame. For example, the valve flap may be affixed via a top edge to a mating feature of the valve frame. The valve flap may be a one-way flap or a two-way flap. For example, the valve flap may be a one-way flap with a sealed position and an open position. The valve flap may have a sealed position, in which the valve flap may cooperate (i.e., seal) with at least a part of the valve frame, such as a valve frame sealing plane. The valve flap may have an open position, in which the valve flap may extend away from the valve frame. In the sealed position, the valve flap may prevent flow of air across through the drain valve. In the open position, the valve flap may allow for liquid to flow through the drain valve. The force or pressure of liquid on a surface, such as a back surface of the at least one valve flap may force the valve flap into the open position. The liquid is then able to flow out of the drain valve. As soon as the liquid flows through the at least one flow opening, the at least one valve flap returns into a sealed position. By returning into the sealed position, the flow of air in a direction opposing the flow of liquid is prevented.

The at least one valve frame may include at least one sealing plane. The sealing plane may function to cooperate with the at least one valve flap. The sealing plane may be located about a perimeter of the at least one flow opening. The sealing plane may cooperate with the at least one valve flap to seal the drain valve. For example, an entire perimeter of the sealing plane may come into contact with a surface, such as a rear surface, of the valve flap. When the sealing plane is in contact with the valve flap, the at least one flow opening may be completely sealed. The at least one sealing plane may include a knife edge about at least a portion or all of the sealing plane perimeter. The at least one knife edge may allow the valve flap to function even in below freezing conditions. For example, by providing a minimal contact surface of the knife edge with the at least one valve flap, in freezing conditions, the at least one valve flap may easily overcome a freezing condition to separate from the knife edge and move from a sealed position into an open position.

The at least one valve frame may include a valve flap mating feature. The valve flap mating feature may function to affix at least one valve flap to at least one valve frame; allow a valve flap to move from a sealed to an open position and vice-versa; or both. The valve flap mating feature may be located on any portion of the valve frame, such as a front portion, such as along a front top portion. The at least one valve frame may include one or more engagement features to affix the at least one valve flap to the at least one valve frame. For example, one or more protrusions, screws, tabs, push-pins, the like, or a combination thereof. The at least one valve frame may include one or more protrusions or other engagement features to locate the at least one flap onto the at least one valve frame. For example, the at least one valve frame may include one or more protrusions along a top edge which may be inserted through one or more openings of the at least one valve flap. The at least one valve frame may sandwich at least a portion of the at least one valve flap to retain the at least one flap to the at least one valve frame. The at least one frame may include an arm to sandwich the at least one flap to the at least one valve frame. The at least one arm may be separate from or integral with the at least one valve frame. For example, an arm extension may extend from a side of the at least one frame. The at least one arm may be integral with the at least one frame via a living hinge. The at least one arm may cooperate and engage with one or more features of the frame to sandwich a portion of the at least one flap. For example, the at least one arm may pivot about the living hinge toward a front surface of the valve frame. The at least one arm may include one or more engagement features to affix the at least one arm to the frame. The at least one arm may include one or more openings which receive one or more protrusions. The one or more openings of the at least one arm may have an snap-fit, interference-fit, a loose fit, a friction fit, the like, or any combination thereof with the one or more protrusions of the at least one frame. These one or openings may engage with the same protrusions which are located within openings of the at least one valve flap. The arm may include one or more protrusions, such as tab which may engage with an opening of the at least one frame. For example, the at least one frame may have an opening for mating with the tab on a side opposing the living hinge, such that the arm is attached to the frame on both sides (i.e., at the living hinge and at the opening on an opposing side of the living hinge).

The drain valve of the present disclosure may function by opening the at least one valve flap into an open position to allow liquid to pass through at least one flow opening, by closing the at least one valve flap into a sealed position to prevent liquid pass through at least one flow opening, or both. For example, the at least one valve flap may be under a positive pressure or a negative pressure. The positive pressure or negative pressure may be a pressure or force applied by air flow on one side or both sides of the at least one valve flap. While under the positive or negative pressure, the at least one valve flap may be in the sealed position. The positive or negative pressure may engage the at least one valve flap to a portion of the at least one valve frame, such as the sealing plane, to seal the at least one flow opening. The at least one valve flap may move into an open position when a pressure opposing a negative or a positive pressure is applied to the at least one flap. For example, a pressure or force applied by liquid on one side of the at least one valve flap. The opposing pressure or force applied by liquid on one side of the at least one valve flap may be sufficient to overcome a positive or negative pressure. The pressure or force applied by the liquid moves the at least one valve flap from the sealed position into an open position to allow the liquid to flow through at least one flow opening. Once the liquid flows through the at least one flow opening such that the liquid no longer applies pressure to the at least one valve flap, the at least one valve flap may return to the sealed position. In the sealed position, the at least one valve flap may prevent air flow through the at least one flow opening.

Illustrative Embodiments

The following descriptions of the Figures are provided to illustrate the teachings herein, but are not intended to limit the scope thereof.

Figure 2:
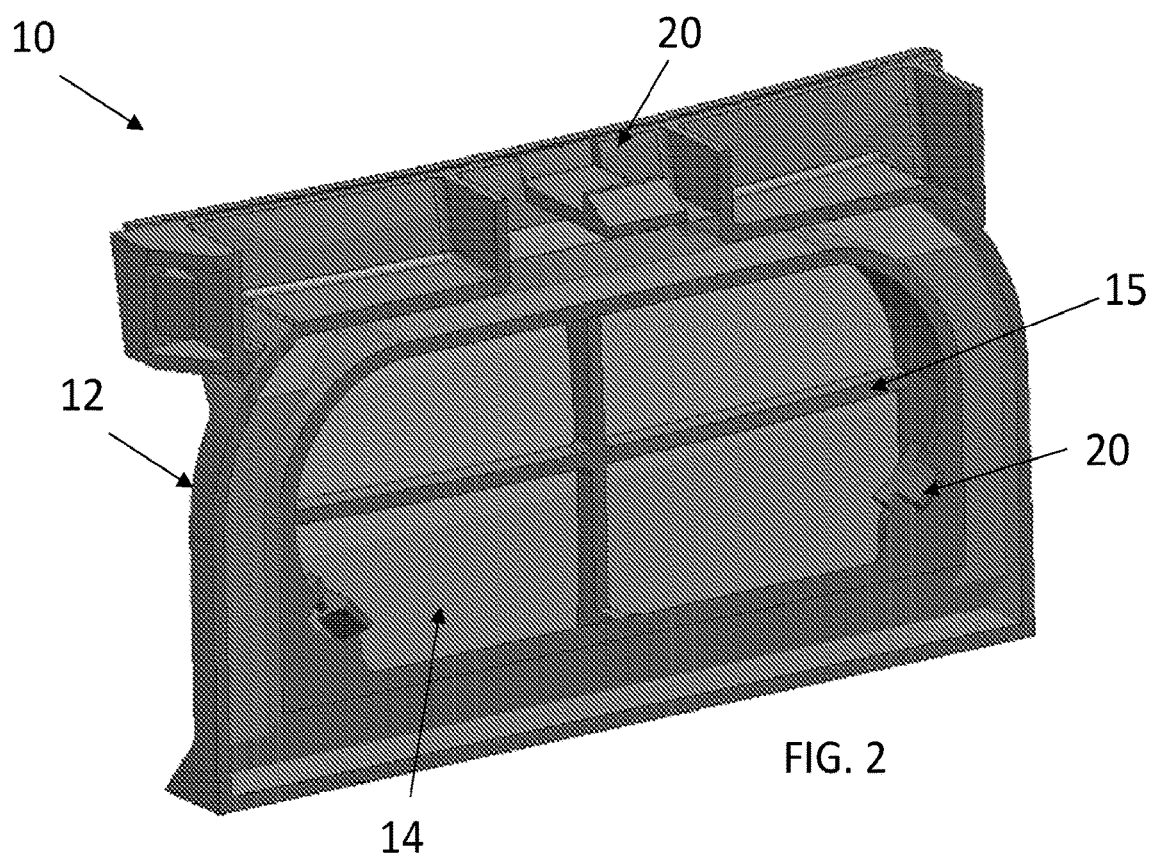
FIG. 2 illustrates a rear side of a drain valve.

FIGS. 1 and 2 illustrate a drain valve 10. FIG. 1 illustrates a front side of the drain valve 10 and FIG. 2 illustrates a rear side of a drain valve 10. The drain valve may include a valve frame 12. The valve frame 12 may include at least one flow opening 13 which allow water to pass through the drain valve 10. The valve frame 12 may include one or more support structures 15 across the at least one flow opening 13. The valve frame 12 may include one or more attachment features 20 for engaging the drain valve 10 with a structure (not shown), such as a drain opening in a vehicle body. The one or more attachment features 20 may be retention tabs which provide for a snap-fit of the drain valve 10 with a drain opening (not shown). The drain valve 10 may include a drain flap 14. The drain flap 14 may open to allow water to pass through, such as from the back to the front of the drain valve 10. The drain flap 14 may remain in a closed position (such as shown). In the closed position, the drain flap 14 may prevent air flowing through the drain valve 10. In the closed position, the drain flap 14 may seal the drain valve 10. The drain valve 10 may cooperate with a sealing plane 22 of the valve frame 12. The valve frame 12 may include knife edge. The knife edge may minimize or prevent freeze up of the drain valve 10, so that the drain valve 12 may continue to function to allow water to pass through. The sealing plane 22 may allow the valve flap 12 to be a one-way flap. For example, the sealing plane 22 may allow the valve flap 14 to open in one direction, such as forward of the valve drain 10. The sealing plane 22 may prevent movement of the valve flap 14 toward the rear of the valve drain 10. The valve frame 12 may include a valve flap mating feature 16 to assemble the valve flap 14 to the valve frame 12. The valve flap 14 may be located onto the valve frame 12 via one or more frame protrusions 18.

Figure 3:
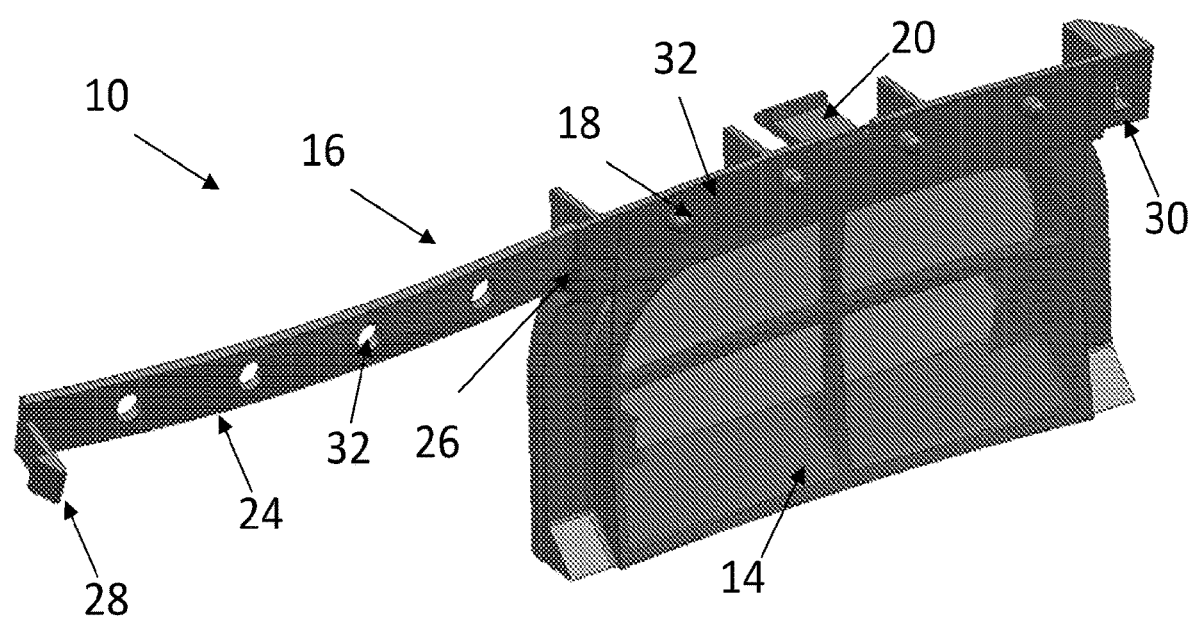
FIG. 3 illustrates a living hinge of a drain valve to assemble a flap of the drain valve.

FIG. 3 illustrates a drain valve 10 with a valve flap mating feature 16 to assemble a valve flap 14 to the valve frame 12. The valve flap mating feature 16 may include an arm 24 integral with the valve frame 12 via a living hinge 26. The arm 24 may include one or more receiving features 32, such as openings, which mate with one or more protrusions 18. For example, the one or more openings 32 may have an interference fit with the one or more protrusions 18. The valve flap 14 may be located onto the valve frame 12 by one or more protrusions 18 inserted through one or more openings (not shown) of the valve flap 14. The valve flap 14 may be retained to the valve frame 12 by closing the valve flap mating feature 16. For example, the arm 24 may be pivoted about the living hinge 26. To affix the arm 24 to an opposing end of the valve frame 12 as the living hinge 26, the arm may include a retention tab 28. The retention tab may locate within a receiving opening 30. When the valve flap mating feature 16 is closed, the distance between the arm 24 and a rear surface of the frame 32 may sandwich a portion, such as a top portion, of the valve flap 14. The valve flap mating feature 16 may be a hinge point or pivot point about which the valve flap 14 may tend to rotate about into an open and/or closed position.

Any numerical values recited in the above application include all values from the lower value to the upper value in increments of one unit provided that there is a separation of at least 2 units between any lower value and any higher value. These are only examples of what is specifically intended and all possible combinations of numerical values between the lowest value, and the highest value enumerated are to be considered to be expressly stated in this application in a similar manner. Unless otherwise stated, all ranges include both endpoints and all numbers between the endpoints. The term "consisting essentially of" to describe a combination shall include the elements, ingredients, components, or steps identified, and such other elements ingredients, components or steps that do not materially affect the basic and novel characteristics of the combination. The use of the terms "comprising" or "including" to describe combinations of elements, ingredients, components, or steps herein also contemplates embodiments that consist essentially of the elements, ingredients, components, or steps.

Plural elements, ingredients, components, or steps can be provided by a single integrated element, ingredient, component, or step. Alternatively, a single integrated element, ingredient, component, or step might be divided into separate plural elements, ingredients, components, or steps. The disclosure of "a" or "one" to describe an element, ingredient, component, or step is not intended to foreclose additional elements, ingredients, components, or steps.

The invention claimed is:

1. A drain valve, comprising:
   at least one frame including a flow opening; and
   (ii) at least one flap secured to the at least one frame;
   wherein the drain valve has at least two positions:
   a sealed position, in which the at least one flap prevents airflow by covering the flow opening; and
   (ii) an open position, in which the at least one flap allows liquid to flow through the at least one drain valve;
   (iii) wherein the at least one frame includes at least one living hinge and at least one arm; and
       wherein the at least one arm pivots about the living hinge to retain a portion of the at least one flap between a surface of the at least one frame and a surface of the at least one arm.

2. The drain valve of claim 1, wherein the at least one frame includes at least one sealing plane to cooperate with the at least one flap.

3. The drain valve of claim 1, wherein the sealing plane is located about a periphery of at least one flow opening.

4. The drain valve of claim 1, wherein the drain valve allows the liquid to flow through the at least one drain valve while substantially free of any back pressure opposing the flow of the liquid.

5. The drain valve of claim 2, wherein the at least one flap is affixed along a hinge to the at least one frame.

6. The drain valve of claim 1, wherein the at least one frame includes one or more attachment features to affix the drain valve to a drain opening.

7. A vehicle body structure, comprising:
   (i) at least one drain valve as claimed in claim 2;
   (ii) at least one drain opening;
   wherein the at least one drain valve is located within the at least one drain opening;
   wherein the at least one drain valve has at least two positions:
   a. a sealed position, in which the at least one flap prevents airflow into the body structure; and
   b. an open position, in which the at least one flap allows liquid to flow through the at least one drain valve out of the body structure wherein the at least one sealing plane includes a knife edge.

8. The vehicle body structure of claim 7, wherein the vehicle body structure is an automotive vehicle body structure.

9. The vehicle body structure of claim 7, wherein the automotive vehicle body structure includes a plenum, a door opening perimeter, or both.

10. The vehicle body structure of claim 7, wherein the at least one frame includes at least one sealing plane to cooperate with the at least one flap.

11. The vehicle body structure of claim 10, wherein the sealing plane is located about a periphery of at least one flow opening.

12. The vehicle body structure of claim 7, wherein the drain valve allows the liquid to flow through the at least one drain valve while substantially free of any back pressure opposing the flow of the liquid.

13. The vehicle body structure of claim 7, wherein the at least one flap is in the sealed position, unless contacted by a pressure of the liquid contact a surface of the at least one flap.

14. The vehicle body structure of claim 13, wherein a force or a pressure applied by a liquid to a surface of the at least one flap moves the flap from a sealed position into an open position.

15. The vehicle body structure of claim 14, wherein when a force or a pressure applied by a liquid to a surface of the at least one flap is removed, the flap moves from an open position to a sealed position.

16. The vehicle body structure of claim 7, wherein the at least one flap is affixed along a hinge to the at least one frame.

17. The vehicle body structure of claim 7, wherein the at least one frame includes one or more attachment features to affix the drain valve to a drain opening.

18. The vehicle body structure of claim 7, wherein the at least one frame includes at least one living hinge and at least one arm; and
   wherein the at least one arm pivots about the living hinge to retain a portion of the at least one flap between a surface of the at least one frame and a surface of the at least one arm.

* * * * *